US012580605B1

(12) United States Patent
Obeidat et al.

(10) Patent No.: US 12,580,605 B1
(45) Date of Patent: Mar. 17, 2026

(54) SYSTEM FOR REDUCING INTERFERENCE BETWEEN COMPONENTS OF A WIRELESS DEVICE

(71) Applicant: AMAZON TECHNOLOGIES, INC.,
Seattle, WA (US)

(72) Inventors: Khaled Ahmad Obeidat, San Jose, CA
(US); Rohit Sammeta, Palo Alto, CA
(US); Johns George, Newark, CA
(US); Tahmid Rashid, Tracy, CA (US);
Chunyu Wu, Sunnyvale, CA (US); **Wei
Lin, Mill Valley, CA (US); Arianna
Stephanie Mestas**, Fairfield, CA (US);
Chen Chen, Saratoga, CA (US); **Jagan
Vaidyanathan Rajagopalan**, San Jose,
CA (US)

(73) Assignee: AMAZON TECHNOLOGIES, INC.,
Seattle, WA (US)

( * ) Notice: Subject to any disclaimer, the term of this
patent is extended or adjusted under 35
U.S.C. 154(b) by 265 days.

(21) Appl. No.: 18/337,602

(22) Filed: Jun. 20, 2023

(51) Int. Cl.
*H04B 1/44* (2006.01)
*H01Q 1/22* (2006.01)

(52) U.S. Cl.
CPC ............. *H04B 1/44* (2013.01); *H01Q 1/2291*
(2013.01)

(58) Field of Classification Search
CPC ....... H01Q 1/2291; H01Q 1/521; H01Q 21/28
USPC ......................................................... 455/78
See application file for complete search history.

(56) References Cited

U.S. PATENT DOCUMENTS

| | | | | | |
|---|---|---|---|---|---|
| 7,148,846 | B2 * | 12/2006 | Qi | ......................... | H01Q 9/0435 |
| | | | | | 343/702 |
| 9,786,994 | B1 * | 10/2017 | Lee | .................... | H01Q 21/0006 |
| 2012/0142296 | A1 * | 6/2012 | Cotterill | .............. | H04B 7/0805 |
| | | | | | 455/230 |
| 2013/0088404 | A1 * | 4/2013 | Ramachandran | ........ | H01Q 7/00 |
| | | | | | 343/861 |
| 2015/0372656 | A1 * | 12/2015 | Mow | ......................... | H03H 7/38 |
| | | | | | 455/77 |
| 2019/0027824 | A1 * | 1/2019 | Pajona | ..................... | H01Q 7/00 |

FOREIGN PATENT DOCUMENTS

| | | | | | |
|---|---|---|---|---|---|
| CN | 209250801 U | * | 8/2019 | | |
| GB | 2510318 A | * | 8/2014 | .............. | H01Q 1/38 |
| WO | WO-2017061756 A2 | * | 4/2017 | .............. | H01Q 5/50 |

* cited by examiner

*Primary Examiner* — Wesley L Kim
(74) *Attorney, Agent, or Firm* — Lindauer Law, PLLC

(57) ABSTRACT
A wireless device may use two or more communication
interfaces, in which operation of a first interface interferes
with communication using a second interface. For example,
a circuit board within a device housing may include an
antenna used for communication with a first communication
interface that is spaced apart from circuitry that includes a
second communication interface. A conductor connected to
the circuitry extends toward the antenna to transfer energy
using induction. The conductor may engage a central portion
of the circuitry associated with lower current than the edges
of the circuitry to further reduce interference. The antenna is
operated at a frequency that differs from the resonance
frequency of the antenna, which may reduce the effect of
interference to a larger extent than the associated loss in
efficiency of the antenna. A matching network or other type
of transformer is used to tune the output of the antenna.

20 Claims, 7 Drawing Sheets

ANTENNA ELEMENT 210

SECOND SLOT
402(2)

FIRST SLOT
402(1)

ANTENNA
CONDUCTOR
404(1)

ANTENNA
CONDUCTOR
404(2)

LOOP
CONDUCTOR
212

FIRST ANTENNA
114(1)

SECOND ANTENNA
114(2)

400

500

NEUTRALIZATION LINE 508

FIRST INDUCTIVE
LOOP 506(1)

INDUCTOR(S) 510

EXTENSION 504

SECOND INDUCTIVE
LOOP 506(2)

LOOP
CONDUCTOR 212

FOURTH
ANTENNA
114(4)

THIRD
ANTENNA
114(3)

COMMUNICATION
INTERFACE 118(4)

CIRCUITRY 206

MATCHING
NETWORK(S) 214

COMMUNICATION
INTERFACE 118(1)

OTHER CIRCUITRY
502

Y
Z   X

600

ANTENNA ELEMENT 210

NEUTRALIZATION LINE 508

ANTENNA CONDUCTOR 404(1)

ANTENNA CONDUCTOR 404(2)

LOOP CONDUCTOR 212

SPACE 602

FIRST INDUCTIVE LOOP 506(1)

SECOND INDUCTIVE LOOP 506(2)

EXTENSION 504

MATCHING NETWORK(S) 214

COMMUNICATION INTERFACE 118(4)

COMMUNICATION INTERFACE 118(1)

CIRCUITRY 206

OTHER CIRCUITRY 502

Y
Z ➤ X

FIRST ANTENNA
114(1)

SECOND ANTENNA
114(2)

CAPACITIVE
PAD
702(1)

CAPACITIVE
PAD
702(2)

NEUTRALIZATION
LINE 508

EXTENSION
504

INDUCTOR(S)
510

CIRCUITRY
206

LOOP
CONDUCTOR
212

MATCHING
NETWORK(S) 214

COMMUNICATION
INTERFACE 118(1)

OTHER CIRCUITRY
502

COMMUNICATION
INTERFACE 118(4)

Y

Z → X

SYSTEM FOR REDUCING INTERFERENCE BETWEEN COMPONENTS OF A WIRELESS DEVICE

BACKGROUND

A device that uses multiple communication interfaces, such as a Wi-Fi interface and a High-Definition Multimedia Interface (HDMI), may be affected by interference. For example, use of an HDMI or other devices engaged with the HDMI may interfere with communication using a Wi-Fi interface. Directional antennas and shielding may be used to at least partially mitigate such interference, but these elements increase the resources and cost associated with the device.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
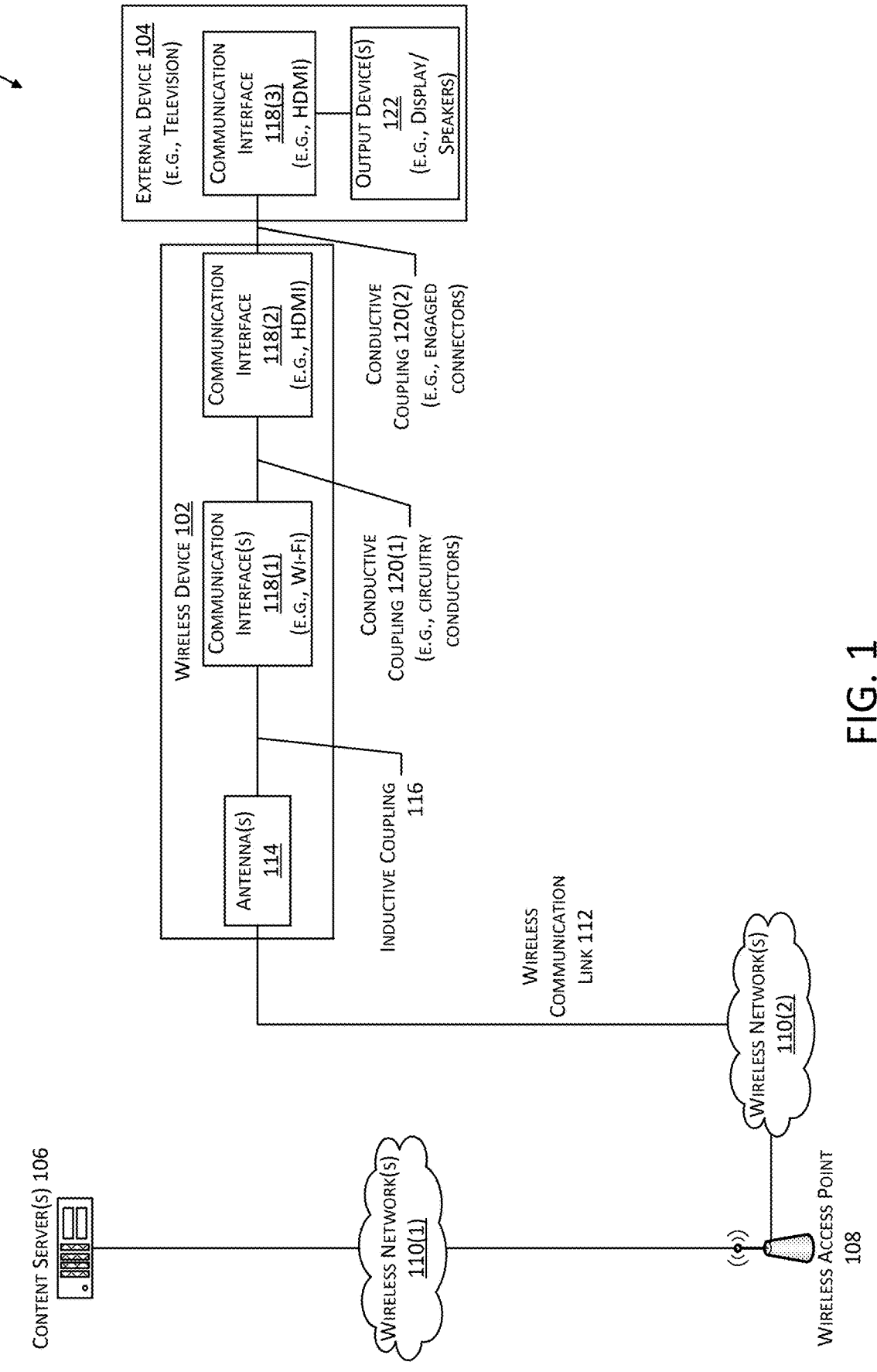
FIG. 1 is a diagram depicting an implementation of a system in which a device that receives wireless data is connected to an external device to provide the received data to the external device for output.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Many wireless devices, and other types of devices, utilize multiple communication interfaces. As one example, a wireless device that engages a High-Definition Multimedia Interface (HDMI) port of a television may receive audio and video data via a wireless network using a Wi-Fi interface, while sending data to the television for output using a wired High-Definition Multimedia Interface (HDMI) that engages the HDMI port of the television. In some cases, operation of one communication interface may interfere with communication using another communication interface. For example, a Wi-Fi interface may be susceptible to interference during operation of an HDMI interface if signals radiated by the HDMI interface are associated with the same frequency band used by the Wi-Fi interface, especially in cases where the two communication interfaces are physically proximate, such as when located in the same device housing. Operation of other devices, such as a television that engages the HDMI interface of the device, may also interfere with signals sent or received using the Wi-Fi interface. Interference may significantly reduce the range and reliability of communication using a Wi-Fi interface. In some cases, a device may be provided with directional antennas, shielding, or other similar structures to improve noise immunity. However, additional components incorporated into a device for this purpose may increase the time, cost, complexity, and resource utilization associated with manufacture of devices.

Described in this disclosure are arrangements of device components and techniques for operation of a device that reduce the effect of interference on operation of device components without requiring significant additional components or incurring the associated time, cost, and complexity associated with the addition of such components. In one implementation, a device may include a Wi-Fi interface and an HDMI, within a device housing. For example, the communication interfaces may be coupled to a circuit board that includes circuitry for operation of the communication interfaces. The Wi-Fi interface may be proximate to a first end of the housing, while the HDMI is proximate to a second end of the housing that is opposite the first end. Continuing the example, a physical HDMI connector may be positioned at or near an end of the circuit board for engagement with an external device, such as a television. The Wi-Fi interface may operate within one or more frequency bands, such as a band that includes a frequency of 2.4 gigahertz (GHz). The HDMI, when operated, may radiate signals within a frequency band used by the Wi-Fi interface. As a result, signals radiated by the HDMI may interfere with communication using the Wi-Fi interface. In some cases, operation of an external device, such as a television that engages a connector associated with the HDMI, may similarly radiate signals within a frequency band used by the Wi-Fi interface. For example, operation of a television to output a high-resolution (e.g., 4K) video may cause radiation of signals that may interfere with use of the Wi-Fi interface.

To reduce the effect of such interference, an antenna element for use with a first communication interface may be spaced apart from the circuitry to which a second communication interface is coupled. For example, use of a "floating" antenna element may provide electrical isolation between the antenna element and other circuitry. In some cases, the antenna element may be mounted to the same circuit board as the circuitry, but may lack a direct electrical coupling to the circuitry. A conductor that is coupled to the circuitry may extend into the space between the circuitry and the antenna element to a position that is close to the antenna element, such that the conductor may be used to transmit energy between the antenna element and circuitry using induction. Connecting the antenna element to the transceiver using a direct electrical connection may otherwise transfer noise associated with operation of other components of the device, which may be detected by the receiver and degrade performance. In some implementations, the conductor may have a loop shape, and at least a portion of the loop shape may pass proximate to the antenna element. In some implementations, a single antenna element may be operated to function as multiple antennas, each antenna providing gain in different directions. For example, a single antenna element may include a generally planar structure formed from a conductive material, within which one or more slots or other types of openings may be formed. When energy is transferred to the antenna element, such as through use of an inductive loop positioned proximate to a first slot within the antenna element, current within the antenna element may be provided such that the slots and the adjacent material of the antenna element function as a first antenna. When energy is transferred to the antenna element using an inductive loop positioned proximate to a second slot within the antenna element, current within the antenna element may be provided such that the slots and the adjacent material of the antenna element function as a second antenna. The dimensions of the slots or other openings in the antenna element affect the frequency at which each antenna is operated. Use of multiple antennas may allow the device to be used for Multiple-In, Multiple-Out (MIMO) communications in which multiple signals may be sent through multiple antennas while using a single channel, to improve signal quality. In cases where the device includes multiple antennas, the conductor may include multiple loop-shaped regions that each pass proximate to a respective antenna to enable the transfer of energy to and from each antenna. In some implementations, a portion of the conductor may connect multiple loop-shaped regions and function as a neutralization line that provides isolation between individual antennae and between the antennae and other components of the device. One or more inductors may be included on the neutralization line.

In some implementations, the conductor may be coupled to a central portion of the circuitry. For example, a first portion of the circuitry proximate to a first side or edge, and a second portion of the circuitry proximate to a second side or edge, may be associated with greater currents than the central portion of the circuitry. Coupling of the conductor to the central portion may avoid exciting the edges or corners of the circuitry, which may be associated with stronger current modes. In some implementations, the circuitry may include an extension that extends into the space between the circuitry and the antenna, and at least a portion of the conductor may be coupled to the extension. In some cases, a dimension of the extension may be used to provide the conductor with a selected electrical characteristic, such as a resistance value for portions of the conductor that couple the circuitry to inductive portions of the conductor proximate to the antenna.

In some implementations, the structure of the antenna element may be selected to cause the antenna to operate at a frequency that differs from the resonance frequency of the antenna. For example, the resonance frequency of the antenna may be associated with interference from one or more other components of the device or with interference from other devices. Continuing the example, an antenna may be intended for use communicating using a Wi-Fi protocol at a frequency of 2.4 GHz. However, interference associated with operation of an HDMI, or an adjacent television or other device, may interfere with use of the antenna at a resonance frequency of 2.4 GHz. In such a case, the dimensions of one or more slots or other openings in the antenna may cause the antenna to operate at a different frequency. A matching network or other type of transformer may then receive an output from the antenna associated with the different frequency and tune the output to a desired frequency (e.g., the resonance frequency or another frequency that differs from the frequency at which the antenna is operated) within a band of interest. While operation of the antenna at a different frequency may result in reduced efficiency, the interference that may be mitigated using this method may exceed the reduction in efficiency.

In some implementations, one or more additional communication interfaces, connectors, or conductors may be used to attenuate interference associated with the device. For example, while the antenna may be positioned at a first end of a device housing opposite a first communication interface, such as an HDMI, at a second end of the housing, a second communication interface, such as a Universal Serial Bus (USB) that may be used to provide electrical power to the device or exchange data with one or more other devices, may be positioned between the antenna and the first communication interface. The antenna may be positioned proximate to the second communication interface (e.g., within a threshold distance thereof), such that interference from the HDMI or connected device that may affect the antenna is at least partially attenuated by one or more of the second communication interface or a conductor (such as a USB power cable) connected to the second communication interface.

Use of inductive coupling between a floating antenna and electrical circuitry in the device rather than a direct electrical connection, engagement of conductors for inductive coupling with a central portion of the circuitry rather than edges or corners associated with stronger current modes, use of the antenna at a frequency other than the resonance frequency of the antenna when interference at the resonance frequency is present, and use of additional structures or components such as a USB connector and attached conductor to attenuate noise, significantly reduces the effect of interference to a first communication interface caused by operation of a second communication interface. Additionally, any single technique describe above, or any combination of techniques may be used, based on the components associated with a device and the types or frequencies associated with the interference that occurs. Further, while the above techniques may be used as alternatives to directional antennas, shielding, or other elements used to increase noise immunity, in some implementations, such elements may be used in combination with one or more of the above techniques.

FIG. 1 is a diagram 100 depicting an implementation of a system in which a wireless device 102 that receives wireless data is connected to an external device 104 to provide the received wireless data to the external device 104 for output. For example, the wireless device 102 may receive content, such as audio data or video data, from one or more content servers 106, and may provide the content to a television or other type of external device 104 for output. The wireless device 102 may be engaged with the external device 104 through connection of physical connectors. For example, the wireless device 102 may include one of a male or female HDMI connector while the external device 104 includes the other HDMI connector. The wireless device 102 may exchange data with the content server(s) 106 using one or more wireless access points 108.

For example, a content server 106 may provide data to the wireless access point 108 using one or more first wireless networks 110(1). Continuing the example, the first wireless network(s) 110(1) may include the Internet. The wireless device 102 may exchange data with the wireless access point

108 via a wireless communication link 112. As described previously, the wireless device 102 may include one or more antennas 114 configured for wireless communication using one or more protocols, such as a Wi-Fi protocol or a Bluetooth protocol. For example, the wireless device 102 may include two antennas 114 configured for MIMO communication using a Wi-Fi protocol associated with a frequency band of 2.4 GHz. As described previously, the antenna(s) 114 may be electrically isolated from one or more other components of the wireless device 102 and may exchange data with other components of the wireless device 102 via inductive coupling 116. For example, circuitry of the wireless device 102 may lack a direct electrical connection to the antenna 114, but may include one or more communication interfaces 118(1) that exchange data using the antenna 114. Continuing the example, FIG. 1 depicts first communication interfaces 118(1), which may include one or more Wi-Fi communication interfaces. Data from the first communication interface(s) 118(1) may be provided to a second communication interface 118(2) within the wireless device 102 via a conductive coupling 120(1). For example, conductors within the circuitry of the wireless device 102 may include an electrical connection between the first communication interface(s) 118(1) and the second communication interface 118(2).

As described previously, the second communication interface 118(2) may be physically connected to the external device 104, such as through physical engagement of HDMI connectors. Physical engagement between the wireless device 102 and the external device 104 may form a conductive coupling 120(2) between the communication interface 118(2) of the wireless device 102 and a communication interface 118(3) of the external device 104. Data from the communication interface 118(3) of the external device 104 may be provided to one or more output devices 122, such as one or more displays or speakers, for output.

The wireless device 102 may also enable data from the external device 104 to be provided to the content server(s) 106, or one or more other devices. For example, a remote control device that communicates with the external device 104, or one or more input devices associated with the external device 104, may receive input indicative of a request for content. Data indicative of this input may be provided to the communication interface 118(2) of the wireless device 102 via the conductive coupling 120(2). This data may be provided to the first communication interface(s) 118(1) via the conductive coupling 120(1), then provided via the inductive coupling 116 to the antenna(s) 114 for transmission using the wireless networks 110.

Figure 2:
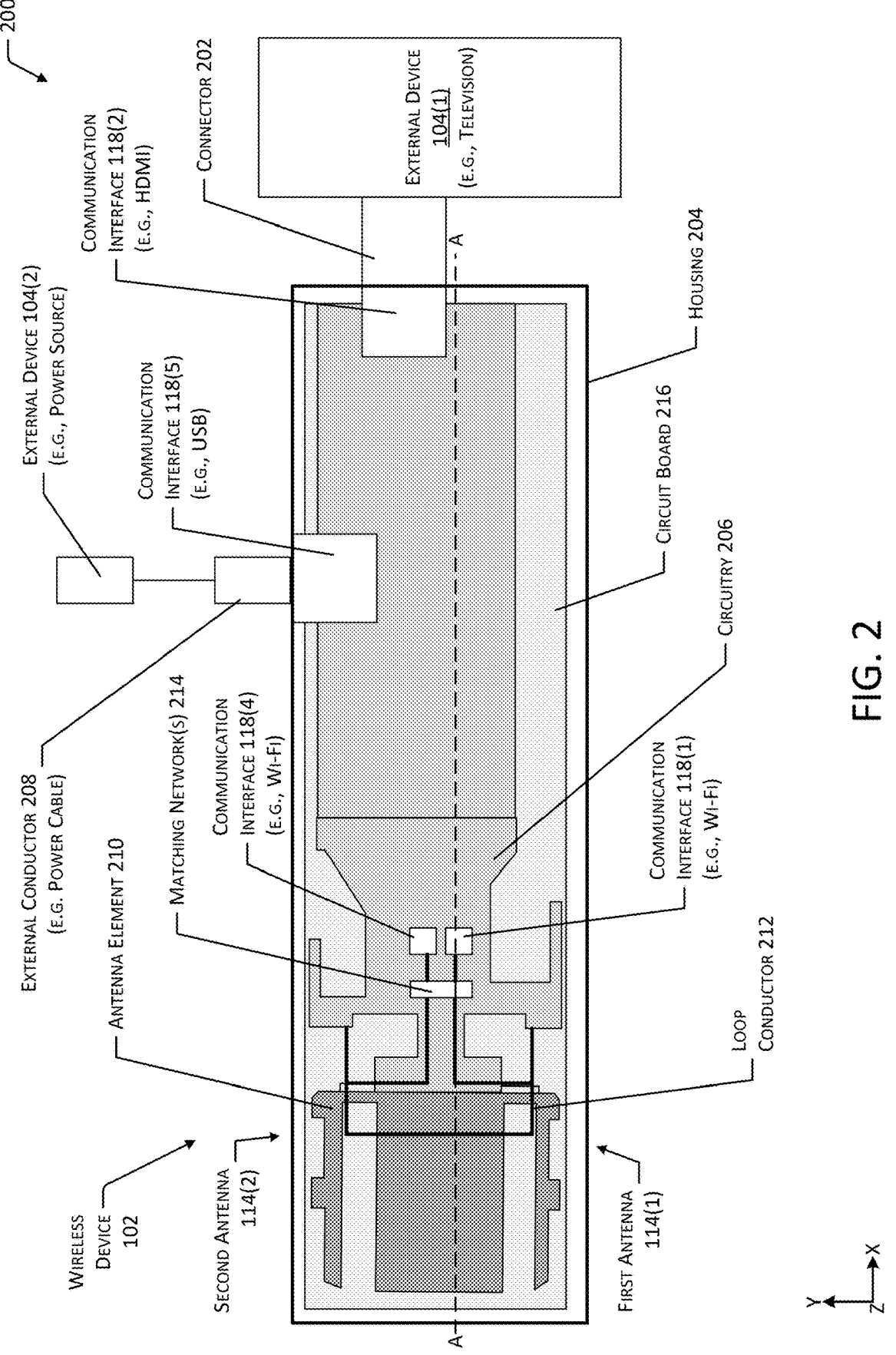
FIG. 2 is a diagram depicting a diagrammatic top view of an implementation of a wireless device having a configuration of components that reduces interference.

FIG. 2 is a diagram 200 depicting a diagrammatic top view of an implementation of a wireless device 102 having a configuration of components that reduces interference. For example, a device may communicate using multiple communication interfaces 118. Different communication interfaces 118 may exchange data using different communication protocols. Continuing the example, FIG. 2 depicts the wireless device 102 including a first communication interface 118(1) and a fourth communication interface 118(4) that may communicate via one or more wireless networks 110 using one or more Wi-Fi protocols. The first communication interface 118(1) may exchange data using a first antenna 114(1), which may be operated by inductively providing energy between a conductor associated with the first communication interface 118(1) and an antenna element 210. The fourth communication interface 118(4) may exchange data using a second antenna 114(2), which may be operated by inductively providing energy between a conductor associated with the fourth communication interface 118(4) and the antenna element 210. A second communication interface 118(2) may include an HDMI having an associated connector 202 that extends through a housing 204 of the device to engage an external device 104(1), such as a television. For example, audio data, video data, or combinations thereof may be received using the first antenna 114(1) and second antenna 114(2), and conducted across circuitry 206 of the wireless device 102 to the second communication interface 118(2), which may provide the data to the external device 104(1) for output. FIG. 2 also depicts the device including a fifth communication interface 118(5), such as a USB interface, which may engage one or more other external devices 104(2). For example, an external conductor 208, such as an electrical cable, may connect the device to an external device 104(2), such as a power source. In some implementations, the wireless device 102 may include one or more other communication interfaces 118. For example, an additional communication interface 118 may operate using one or more Bluetooth protocols and may send and receive data using one of the first antenna 114(1) or the second antenna 114(2). A switch may be used to selectively cause data from the first antenna 114(1) or second antenna 114(2) to be sent to the Bluetooth communication interface or the associated Wi-FI communication interface. Operation of various components of the device, or of one or more external devices 104, may cause interference associated with use of other components of the device. For example, use of one or more of the second communication interface 118(2) or the external device 104(1) may interfere with Wi-Fi communication associated with the first antenna 114(1) and second antenna 114(2).

As described previously, to reduce the effect of interference from components of the wireless device 102, such as the second communication interface 118(2), or from the connected external device 104(1), on communications using the first antenna 114(1) and second antenna 114(2), the antenna element 210 may be spaced apart from the circuitry 206 of the wireless device 102, such that no direct electrical connection exists between the antenna element 210 and the circuitry 206 (e.g., a "floating" antenna structure). To operate the first antenna 114(1) and second antenna 114(2), a loop conductor 212 that is connected to the first communication interface 118(1) and second communication interface 118(2) and that extends into a space between the circuitry 206 and the antenna element 210 may be used. The loop conductor 212 may provide energy to the antenna element 210 using induction. For example, a first inductive loop within the loop conductor 212 may pass proximate to the first antenna 114(1) and a second inductive loop within the loop conductor 212 may pass proximate to the second antenna 114(2). Energy within the inductive loops may be used to excite the antenna element 210, causing the antenna element 210 to function as a first antenna 114(1) when the first inductive loop is used, and as a second antenna 114(2) when the second inductive loop is used. The antennas 114 may operate at frequencies based on the dimensions and other characteristics of the antennas 114. Use of induction to transfer energy to the antenna element 210 may reduce the interference to use of the first antenna 114(1) and second antenna 114(2) that may otherwise be caused by use of the second communication interface 118(2) if a direct electrical connection between the circuitry 206 and the antenna element 210 existed. To further reduce interference associated with use of device components connected to the circuitry 206, the loop conductor 212 may be connected to a central portion of the circuitry 206 rather than the edges thereof. For example, portions of the circuitry 206 proximate to the sides, edges, or corners may be associated with greater currents than the central portion of the circuitry 206. FIG. 2 depicts an extension of the circuitry 206 that extends into the space between the circuitry 206 and antenna element 210, with the loop conductor 212 extending from the central portion of the circuitry 206 along the extension.

Additionally, the circuitry 206 of the device and the antenna element 210 may each include generally flat, planar shapes. Orientation of the antenna element 210 in the same plane as the circuitry 206 or another plane that is generally parallel to the plane of the circuitry 206 may enable at least a portion of the electromagnetic field associated with operation of the second communication interface 118(2) to be orthogonal to at least a portion of the electromagnetic field associated with operation of the first antenna 114(1) and second antenna 114(2).

To further reduce the effect of interference on communications using the first antenna 114(1) and second antenna 114(2), one or more dimensions of the first antenna 114(1) and second antenna 114(2) may be selected to cause operation of the first antenna 114(1) and second antenna 114(2) at a frequency other than the resonance frequency of the antennae. For example, the first antenna 114(1) and second antenna 114(2) may be used for communications associated with a 2.4 GHz band of a Wi-Fi network. However, use of the second communication interface 118(2) may cause interference to use of the first antenna 114(1) and second antenna 114(2) within the band of interest. One or more dimensions of the first antenna 114(1) and second antenna 114(2) may be selected to cause the antennae to operate at a frequency that differs from the band of interest, such as 2.1 GHZ. While operation at a different frequency may reduce the efficiency of the antennae, the decreased effect from interference associated with the second communication interface 118(2) may exceed the decreased efficiency of the antennae, resulting in a net gain in effectiveness of the antennae. One or more matching networks 214 may be used to receive an output from the antennas 114 associated with the frequency at which the antennas 114 are operated and tune the output to a desired frequency within a band of interest.

The position of the fifth communication interface 118(5) and external conductor 208 may further reduce interference associated with operation of device components. For example, the position of the first antenna 114(1) relative to the fifth communication interface 118(5) may enable current associated with the first antenna 114(1) to be directed toward the external conductor 208 rather than the second communication interface 118(2). Reduced coupling between the second communication interface 118(2), which may be a source of noise, and the first antenna 114(1) may reduce the effect of interference, while current routed toward the external conductor 208 may be distributed in a far field radiation pattern.

The reduced interference to use of the first antenna 114(1) and second antenna 114(2) associated with the arrangement of elements within the device may enable the device to be provided with a compact form factor. For example, the antenna element 210 and circuitry 206 may be mounted to a single circuit board 216 that may be placed within a single housing 204. In other implementations, multiple circuit boards 206 to which different elements of the device are mounted may be used.

Figure 3:
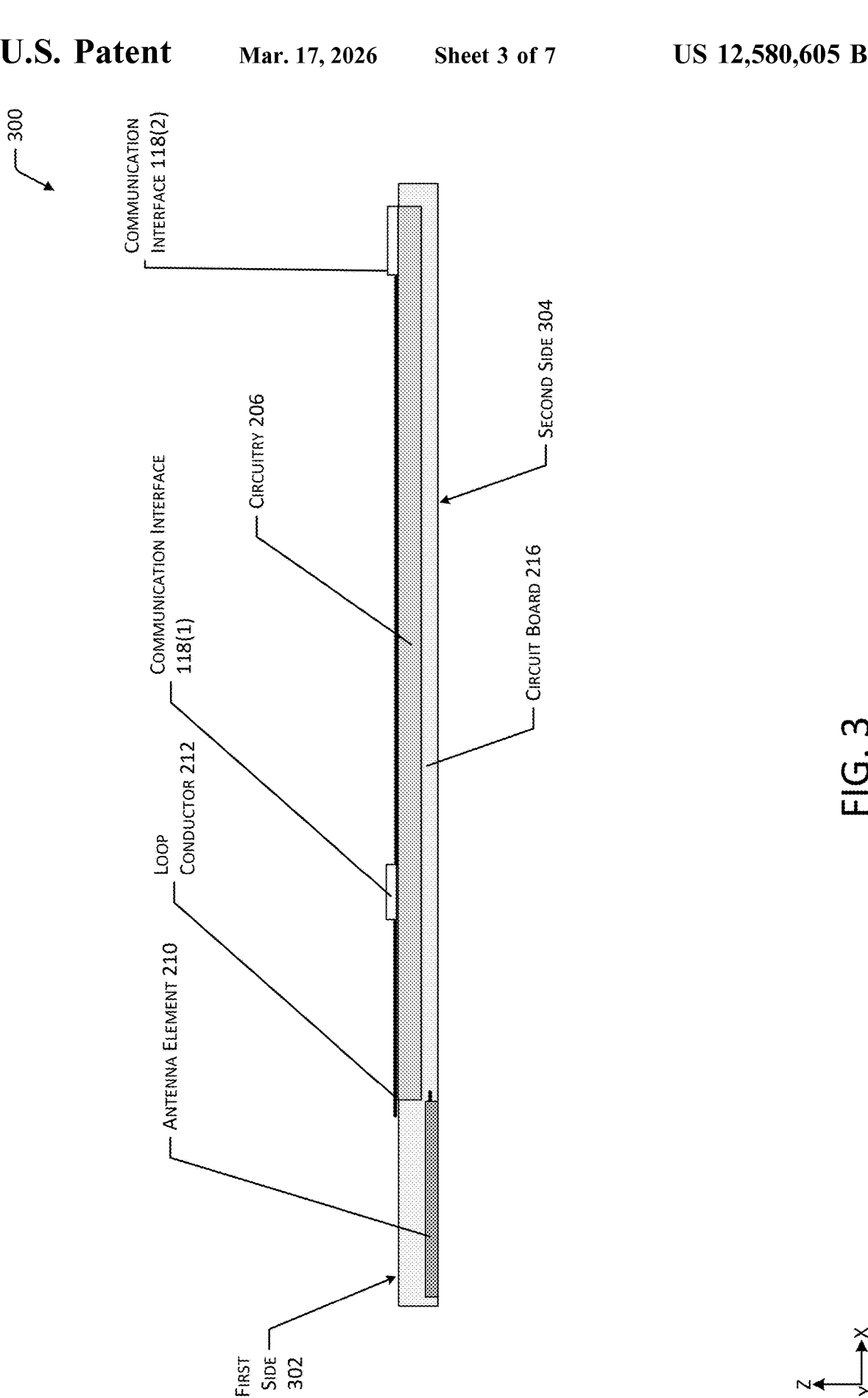
FIG. 3 is a diagram depicting a diagrammatic side view of a portion of the wireless device shown in FIG. 2.

FIG. 3 is a diagram 300 depicting a diagrammatic side view of a portion of the wireless device 102 shown in FIG. 2. As described with regard to FIG. 2, in some implementations, the circuitry 206 and the antenna element 210 of the wireless device 102 may be mounted to the same circuit board 216. For example, the circuit board 216 may include a generally flat, planar structure having a first side 302 opposite a second side 304. The circuitry 206 that includes the communication interfaces 118 and loop conductor 212 may be mounted to the first side 302 of the circuit board, while the antenna element 210 is mounted to the second side 304. Direct electrical connections between the antenna element 210 and the circuitry 206 may be omitted to reduce interference from the second communication interface 118 (2) and connected external device 104 on operation of the antennas 114. However, the position of the loop conductor 212 relative to the antenna element 210 may enable energy to be transferred between the loop conductor 212 and antenna element 210 using induction.

Figure 4:
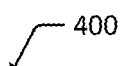
FIG. 4 is a diagram depicting an implementation of the antenna element of the wireless device of FIG. 2.
Figure 4:
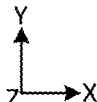

FIG. 4 is a diagram 400 depicting an implementation of the antenna element 210 of the wireless device 102 of FIG. 2. As described with regard to FIG. 2, in some implementations, the antenna element 210 may include a generally flat, planar structure within which the first antenna 114(1) and second antenna 114(2) are formed. For example, the antenna element 210 may be mounted to a circuit board 216 within the housing 204 of the wireless device 102. In some implementations, the antenna element 210 may be mounted to the same circuit board 216 as the circuitry 206 of the device, while being spaced apart and lacking a direct electrical connection with the circuitry 206.

When a first inductive loop of the loop conductor 212 is used to provide energy to a first side of the antenna element 210, current from the loop conductor 212 may be provided proximate to a first slot 402(1) formed in the antenna element 210 and be conducted toward a second slot 402(2), causing the material of the antenna element 210 to function as the first antenna 114(1). When a second inductive loop of the loop conductor 212 is used to provide energy to a second side of the antenna element 210, current from the loop conductor 212 may be provided proximate to the second slot 402(2) and be conducted toward the first slot 402(1), causing the material of the antenna element 210 to function as the second antenna 114(2). Dimensions of the slots 402 and the portions of the antenna element 210 proximate to the slots 402 may affect the frequency at which the first antenna 114(1) and second antenna 114(2) operate when provided with energy. For example, while the resonant frequency associated with the first antenna 114(1) and second antenna 114(2) may be a frequency associated with communication using a Wi-Fi network, such as 2.4 GHZ, the dimensions of the slots 402 or portions of the antenna element 210 may be selected to cause operation of the antennae 114 at a different frequency, such as 2.1 GHZ. A matching network 214 or other type of transformer may be used to receive output from the antenna 114 and tune the output to a band of interest associated with other components mounted to the circuitry 206 of the device. A first antenna conductor 404(1) may be connected to the antenna element 210 close to the location of the first antenna 114(1), and a second antenna conductor 404(2) may be connected to the antenna element 210 close to the location of the second antenna 114(2). The antenna conductors 404 may transfer energy to and receive energy from portions of the loop conductor 212 that are positioned proximate to the antenna conductors 404.

Figure 5:
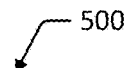
FIG. 5 is a diagram depicting an implementation of a layout of components of a portion of the circuitry associated with the wireless device of FIG. 2.

FIG. 5 is a diagram 500 depicting an implementation of a layout of components of a portion of the circuitry 206 associated with the wireless device 102 of FIG. 2. As described with regard to FIG. 2, in some implementations, the circuitry 206 may include a generally flat, planar structure to which various components of the wireless device 102, such as communication interfaces 118, conductors, switches, matching networks 214 or transformers, and so forth may be mounted. In some implementations, the circuitry 206 may be mounted to the same circuit board 216 as the antenna element 210. In other implementations, different circuit boards 216 may be used.

The portion of the circuitry 206 shown in FIG. 5 includes the first communication interface 118(1) and the fourth communication interface 118(4), as well as the loop conductor 212 that is used to exchange energy between the first communication interface 118(1) and the antenna element 210 and between the fourth communication interface 118(4) and the antenna element 210 using induction. Other circuitry 502 may include the second communication interface 118(2) and the fifth communication interface 118(5) shown in FIG. 2, one or more switches or matching networks 214, one or more additional conductors, and so forth. In some implementations, the other circuitry 502, or a portion of the circuitry 206 depicted in FIG. 5, may include one or more additional antennas 114. For example, the first antenna 114(1) and second antenna 114(2) may be associated with Wi-Fi communications using a first frequency band, such as 2.4 GHz, while a third antenna 114(3) and a fourth antenna 114(4) connected to the circuitry 206 may be associated with communications using a different band, such as 5.0 GHz. Continuing the example, if interference associated with use of the second communication interface 118(2) or other components of the wireless device 102, or other connected devices, is primarily associated with use of the 2.4 GHz band, the arrangement of components described previously may be used to at least partially reduce the effect of interference on the first antenna 114(1) and second antenna 114(2), while additional antennas 114 connected to the circuitry 206 that operate in a 5.0 GHz band may not be significantly affected by the interference.

The circuitry 206 is shown including an extension 504 that extends from a central portion of the circuitry 206 into a space between the circuitry 206 and the antenna element 210. The central portion of the circuitry 206 may be associated with smaller currents than portions of the circuitry 206 proximate to an edge or corner thereof. For example, avoiding exciting of the corners of the circuitry 206, which may be associated with strong current modes, may reduce the interference caused to use of the antennas 114. The loop conductor 212 is connected to the extension 504 and extends from the central portion of the circuitry 206 toward the antenna element 210. A first portion of the loop conductor 212 that is connected to the first communication interface 118(1) forms a first inductive loop 506(1) that may be positioned proximate to the location of the first slot 402(1), such that energy may be exchanged between components of the circuitry 206 and a portion of the antenna element 210 proximate to the first slot 402(1). A second portion of the loop conductor 212 that is connected to the second communication interface 118(2) forms a second inductive loop 506(2) that may be positioned proximate to the location of the second slot 402(2), such that energy may be exchanged between components of the circuitry 206 and a portion of the antenna element 210 proximate to the second slot 402(2) using induction.

The loop conductor 212 may also include a neutralization line 508 that connects the first inductive loop 506(1) with the second inductive loop 506(2). The neutralization line 508 may provide isolation between the first antenna 114(1) and the second antenna 114(2), and between the antennas 114 and other components of the device. For example, one or more inductors 510 may be connected to the neutralization line 508 to tune the coupling between the first antenna 114(1) and second antenna 114(2).

Figure 6:
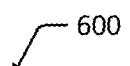
FIG. 6 is a diagram depicting an implementation of the antenna element and circuitry of the wireless device of FIG. 2, positioned in association with one another to enable transfer of energy using induction.

FIG. 6 is a diagram 600 depicting an implementation of the antenna element 210 and circuitry 206 of the device of FIG. 2, positioned in association with one another to enable transfer of energy using induction. As described previously, the wireless device 102 may have a generally small form factor, with the antenna element 210 being placed proximate to the circuitry 206, such as on the same circuit board 216, within the same housing 204, and so forth. However, use of direct electrical connections between the antenna element 210 and circuitry 206 may be omitted to reduce the effect of interference from device components and connected external devices 104 on use of the first antenna 114(1) and second antenna 114(2). As such, a space 602 may be present between the circuitry 206 and the antenna element 210. As described with regard to FIGS. 2-5, the circuitry 206 may include an extension 504 that extends from a central portion thereof into the space 602 toward the antenna element 210. The loop conductor 212 that is connected to the first communication interface 118(1) and the fourth communication interface 118(4) may also be connected to the extension 504 and extend into the space 602 toward the antenna element 210.

The circuitry 206, loop conductor 212, and antenna element 210 may be positioned such that the first inductive loop 506(1) of the loop conductor 212 is positioned proximate to the antenna conductor 404(1) and the first slot 402(1) and the second inductive loop 506(2) of the loop conductor 212 is positioned proximate to the second antenna conductor 404(2) and the second slot 402(2). For example, portions of the loop conductor 212 may be positioned above or below the plane of the antenna element 210 such that the inductive loops 506 each are adjacent to or overlap a respective antenna conductor 404. Continuing the example, as shown in FIG. 6, the neutralization line 508 may at least partially overlap a portion of the antenna element 210. The arrangement of the circuitry 206, loop conductor 212, and antenna element 210 may enable energy to be transferred between the antenna element 210 and the circuitry 206 using induction, such that the antennas 114 may be operated and data associated with use of the antennas 114 may be provided to the first communication interface 118(1) and the fourth communication interface 118(4).

Figure 7:
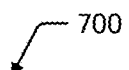
FIG. 7 is a diagram depicting an implementation of antennas and circuitry that capacitively couple the antennas to the circuitry.

FIG. 7 is a diagram 700 depicting an implementation of antennas 114 and circuitry 206 that capacitively couples the antennas 114 to the circuitry 206. A first antenna 114(1) and a second antenna 114(2) are each shown as generally loop-shaped structures, formed from respective pieces of conductive material having one or more slots or openings formed within. The dimensions of the antennas 114 and openings may affect the frequencies at which the antennas 114 operate.

The antennas 114 may be positioned proximate to the circuitry 206, but electrically isolated from the circuitry 206. For example, while the antennas 114 and circuitry 206 may be mounted to the same circuit board 216, no direct electrical connection between the antennas 114 and circuitry 206 may be present. An extension 504 may extend from a central portion of the circuitry 206 into the space 602 between the circuitry 206 and antennas 114. A loop conductor 212 connected to the extension 504, first communication interface 118(1), fourth communication interface 118(4), and other components of the wireless device 102 connected to other circuitry 502 may extend into the space 602 proximate to the antennas 114. In the implementation shown in FIG. 7, a first portion of the loop conductor 212 that is connected to the first communication interface 118(1) may be connected to a capacitive pad 702(1) that is positioned proximate to an opening of the first antenna 114(1), enabling energy to be transferred between the first antenna 114(1) and the circuitry 206 using capacitance. A second portion of the loop conductor 212 that is connected to the fourth communication interface 118(4) may be connected to a capacitive pad 702(2) that is positioned proximate to an opening of the second antenna 114(2), enabling energy to be transferred between the second antenna 114(2) and the circuitry 206 using capacitance. A neutralization line 508 may connect portions of the loop conductor 212 that are connected to the first capacitive pad 702(1) and the second capacitive pad 702(2) to provide isolation between the first antenna 114(1) and the second antenna 114(2), and between the antennas 114 and other components of the wireless device 102. For example, one or more inductors 510 may be connected to the neutralization line 508 to tune the coupling between the first antenna 114(1) and second antenna 114(2).

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
a housing;
a circuit board within the housing;
circuitry on the circuit board, wherein the circuitry comprises a first side, a second side, a central portion between the first side and the second side, and an extension that extends from the central portion;
an antenna element on the circuit board and within the housing, wherein:
the antenna element comprises a first antenna and a second antenna,
the antenna element is spaced apart from the circuitry,
the extension of the circuitry extends into a space between the antenna element and the circuitry,
the first antenna and the second antenna are resonant at a first frequency, and
the first antenna and the second antenna are operated at a second frequency that differs from the first frequency;
a loop comprising a conductor that is connected to the extension of the circuitry, wherein the conductor extends from the circuitry to a position proximate to the antenna element, and wherein energy is transferred between the conductor and the antenna element using induction; and
a matching network connected to the antenna element and the circuitry, wherein the matching network receives a first output associated with the second frequency from the first antenna and the second antenna and provides a second output associated with the first frequency to the circuitry.

2. The device of claim 1, wherein:
the circuitry comprises a first planar structure extending along a first plane;
the antenna element comprises a second planar structure extending along one or more of the first plane or a second plane that is parallel to the first plane; and
at least a portion of a first electromagnetic field associated with operation of the first antenna and the second antenna is orthogonal to at least a portion of a second electromagnetic field associated with operation of the circuitry.

3. The device of claim 1, further comprising:
a Wi-Fi interface on the circuit board and within the housing, wherein the Wi-Fi interface and the antenna element are positioned at a first end of the housing; and
a High-Definition Multimedia Interface (HDMI) on the circuit board and within the housing, wherein the HDMI is positioned at a second end of the housing opposite the first end.

4. A device comprising:
an antenna element comprising a first antenna and a second antenna, wherein the first antenna and the second antenna are resonant at a first frequency, and wherein the first antenna and the second antenna are operated at a second frequency that differs from the first frequency;

circuitry comprising:

a first portion, a second portion, a third portion positioned between the first portion and the second portion, and an extension that extends from the third portion into a space between the circuitry and the antenna element, wherein the antenna element is spaced apart from the circuitry;

a first conductor connected to the extension of the circuitry, wherein the first conductor extends from the circuitry toward the antenna element, and wherein energy is transferred between the antenna element and the circuitry using induction; and a matching network connected to the antenna element and the circuitry, wherein the matching network receives a first output associated with the second frequency from the first antenna and the second antenna and provides, to the circuitry, a second output associated with one or more of the first frequency or a third frequency that differs from the first frequency.

5. The device of claim 4, wherein the first conductor comprises a loop that extends proximate to the antenna element.

6. The device of claim 4, wherein the first conductor comprises a first loop that extends proximate to the first antenna, and a second loop that extends proximate to the second antenna and transfers energy between the circuitry and the second antenna.

7. The device of claim 4, wherein the first conductor comprises a first loop that extends proximate to the first antenna, a second loop that extends proximate to the second antenna, and a neutralization line that connects the first loop to the second loop, and wherein the neutralization line comprises one or more inductors.

8. The device of claim 4, wherein:

the antenna element comprises a slot formed therein; and at least one dimension of the slot causes the antenna to operate at the second frequency that differs from the first frequency.

9. The device of claim 4, wherein the first portion of the circuitry is associated with a first current, the second portion of the circuitry is associated with a second current, and the third portion of the circuitry is associated with a third current, and wherein the third current is less than the first current and the second current.

10. The device of claim 4, further comprising:

a housing that encloses the antenna element and the circuitry; and a communication interface positioned at a first end of the housing, wherein:

the communication interface exchanges data using a first communication protocol, the antenna element is positioned at a second end of the housing opposite the first end, and the first antenna is associated with a second communication protocol that differs from the first communication protocol.

11. The device of claim 4, further comprising:

a housing that encloses the antenna element and the circuitry;

a first communication interface positioned at a first end of the housing, wherein the antenna element is positioned at a second end of the housing opposite the first end; and a second communication interface positioned between the first end and the second end, wherein the first antenna is within a threshold distance of the second communication interface and wherein interference associated with the first antenna is at least partially attenuated by one or more of the second communication interface or a second conductor external to the housing and that is coupled to the second communication interface.

12. The device of claim 11, wherein the first communication interface comprises a High-Definition Multimedia Interface (HDMI) and the second communication interface comprises a Universal Serial Bus (USB) interface.

13. A device comprising:

an antenna element comprising a first antenna and a second antenna, the antenna element comprising a first opening associated with the first antenna and a second opening associated with the second antenna, wherein the first antenna and the second antenna are resonant at a first frequency;

circuitry, wherein the antenna element is spaced apart from the circuitry;

a first conductor connected to the circuitry, wherein the first conductor extends from the circuitry toward the antenna element and transfers energy between the antenna element and the circuitry, and wherein a first dimension of the first opening causes the first antenna to operate at a second frequency that differs from the first frequency; and a matching network connected between the first antenna and circuitry, wherein the matching network receives a first output associated with the second frequency from the antenna and provides a second output associated with one or more of the first frequency or a third frequency that differs from the second frequency to the circuitry.

14. The device of claim 13, wherein the first conductor comprises a first portion that transfers energy to the first antenna, a second portion that transfers energy to the second antenna, and a third portion that connects the first portion to the second portion to at least partially isolate the first antenna from the second antenna.

15. The device of claim 13, further comprising:

a first communication interface connected to the circuitry and the first conductor, wherein the first communication interface exchanges data using a first communication protocol;

a second communication interface connected to the circuitry and the first conductor, wherein the second communication interface exchanges data using a second communication protocol; and a switch configured to cause the second output from the matching network to be provided to one of the first communication interface or the second communication interface.

16. The device of claim 13, further comprising:

a housing that at least partially encloses the antenna element and the circuitry, wherein the antenna element is positioned at a first end of the housing;

a first communication interface positioned at a second end of the housing opposite the first end; and a second communication interface positioned between the first end and the second end, wherein the first antenna is within a threshold distance of the second communication interface, and wherein interference associated with the first antenna is at least partially attenuated by one or more of the second communication interface or a second conductor external to the housing and that is coupled to the second communication interface.

17. The device of claim 13, wherein the circuitry comprises:

a first portion associated with a first current;

a second portion associated with a second current; and a third portion associated with a third current, wherein the third current is less than the first current and the second current, and wherein the first conductor is connected to the third portion.

18. The device of claim 13, wherein:

the circuitry comprises a portion that extends toward the first antenna into a space between the first antenna and the circuitry; and the first conductor is connected to the portion of the circuitry.

19. The device of claim 13, wherein:

the first conductor comprises a loop shape that extends into a space between the antenna element and the circuitry; and the first conductor transfers energy between the antenna element and the circuitry using induction.

20. The device of claim 13, wherein:

the circuitry extends along a first plane;

the antenna element extends along one or more of the first plane or a second plane that is parallel to the first plane; and at least a portion of a first electromagnetic field associated with operation of the first antenna is orthogonal to at least a portion of a second electromagnetic field associated with operation of the circuitry.

\* \* \* \* \*